United States Patent
Barhudarian et al.

(10) Patent No.: US 11,252,146 B2
(45) Date of Patent: Feb. 15, 2022

(54) SERVER TO SERVER COMMUNICATION

(71) Applicant: MICROSOFT TECHNOLOGY LICENSING, LLC, Redmond, WA (US)

(72) Inventors: Violet Anna Barhudarian, Kirkland, WA (US); Yordan Ivanov Rouskov, Seattle, WA (US); Radhika Kashyap, Redmond, WA (US); Pui-Yin Winfred Wong, Redmond, WA (US); George Adrian Drumea, Kirkland, WA (US)

(73) Assignee: MICROSOFT TECHNOLOGLY LICENSING, LLC, Redmond, WA (US)

( * ) Notice: Subject to any disclaimer, the term of this patent is extended or adjusted under 35 U.S.C. 154(b) by 189 days.

(21) Appl. No.: 16/688,707

(22) Filed: Nov. 19, 2019

(65) Prior Publication Data
US 2021/0152547 A1    May 20, 2021

(51) Int. Cl.
*G06F 21/00*    (2013.01)
*H04L 29/06*    (2006.01)
*H04L 29/08*    (2006.01)

(52) U.S. Cl.
CPC ........ *H04L 63/0846* (2013.01); *H04L 63/068* (2013.01); *H04L 63/0876* (2013.01);
(Continued)

(58) Field of Classification Search
CPC ............... H04L 63/0846; H04L 63/068; H04L 63/0876; H04L 63/101; H04L 63/20;
(Continued)

(56) References Cited

U.S. PATENT DOCUMENTS 10,721,222  B2 *   7/2020  Feijoo ................... G06F 21/335
2012/0260322  A1 *  10/2012  Logan ..................... G06F 21/33
726/6

(Continued)

OTHER PUBLICATIONS

Hardt, D., "RFC 6749, The OAuth 2.0 Authorization Framework", Retrieved from <<https://tools.ietf.org/html/rfc6749>>, Oct. 2012, 77 Pages.

(Continued)

*Primary Examiner* — Kendall Dolly
(74) *Attorney, Agent, or Firm* — Workman Nydegger

(57) ABSTRACT

Managing user sessions in a networked computing environment. A method includes, at an identity provider computer system, providing a first id token to a resource provider for an entity. The first id token has therein a first policy check interval having a value defining a period when the first id token should be revalidated. Due to expiration of the first policy check interval, a first refresh token is received from a resource provider computer system that received the first id token. As a result of receiving the first refresh token from the resource provider computer system, the identity provider computer system evaluates conditional access policy for the entity. If the identity provider computer system determines that the conditional access policy for the entity has been met, the identity provider computer system provides a new id token and a new refresh token to the resource provider computer system.

20 Claims, 6 Drawing Sheets

(52) U.S. Cl.
CPC ............ *H04L 63/101* (2013.01); *H04L 63/20* (2013.01); *H04L 67/143* (2013.01)

(58) Field of Classification Search
CPC . H04L 67/143; H04L 63/108; H04L 63/0807; G06F 21/445; G06F 2221/2129
See application file for complete search history.

(56) References Cited

U.S. PATENT DOCUMENTS

| | | |
|---|---|---|
| 2016/0259936 A1 | 9/2016 | Mukherjee et al. |
| 2018/0316657 A1* | 11/2018 | Hardt ..................... H04L 67/06 |
| 2019/0238598 A1* | 8/2019 | Mohamad Abdul ......................... H04L 63/0807 |

OTHER PUBLICATIONS

"International Search Report and Written Opinion Issued in PCT Application No. PCT/US20/059897", dated Feb. 26, 2021, 13 Pages.

* cited by examiner

SERVER TO SERVER COMMUNICATION

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

This interconnection has facilitated the proliferation of so-called web applications. In particular, a user can use a web application where the majority of the computational activities are performed on a remote server while the user interacts with a small local client (in terms of processing power, storage, or other resources). For example, a user may access an email or word processing application implemented at an online server through a simple browser interface. In this example, the browser performs a minimal amount of computing while the online server performs the majority of the computing processes required to implement the email application or word processing application. Thus, many users use web applications.

When web applications were originally developed, there was a problem identified whereby the web applications had difficulty in maintaining context for user actions while simultaneously enforcing id token based conditional access policies.

Ordinarily, a user obtains use of an id token, by a resource provider redirecting the user to an identity provider to authenticate to the identity provider to allow the resource provider to obtain and id token to allow the user to access resources at a web-based resource provider. Typically, the id token has a short lifespan, such as 1 hour. This lifespan is selected due to the need to evaluate policies on a regular basis due to those policies being updated. Alternatively or additionally, policies may need to be updated as a computing environment changes over time. For example, if the user deletes their account, access should be revoked. This can occur by an identity provider not providing an additional id token to a web application for the entity when the entity tries to re-authenticate with the identity provider after having removed their user account. Alternatively or additionally, new policies may be established at the identity provider. Any requests for id tokens from the identity provider will be evaluated in light of these new policies. Id tokens are therefore issued based on the updated policies. Thus, it is desirable that reauthentication occur according to reasonable time periods to allow reasonable enforcement of changing user contexts, computing environments, or policies.

At the expiration of the id token, the id token can no longer be used to authenticate the user to a front end of a web service. This causes the entity to be redirected back to an identity provider to have a new id token issued to the web application for the entity. Previously, this was done in a fashion whereby the user context would be lost when reauthentication occurred as the user was required to re-authenticate their identity by providing appropriate credentials in order for a new id token to be issued to the resource provider which could be used to allow the entity access to the web application.

However, currently, systems allow for reauthentication in a fashion such that the user is unaware that a new id token is being requested. For example, the user will be accessing a web application, such as a web-based email or word processing application. The id token will expire. This causes the web application to be redirected to the identity provider to obtain a current id token. The entity will use a refresh token provided to the identity provider which allows a new id token to be issued without the need for providing access credentials. Rather, the refresh token can be used so long as the entity is compliant with conditional access policy at the identity provider. Nonetheless, the entity will need to cause a new id token to be issued due to an invalidated user session. As intimated above, this occurs approximately every 1 hour in some common embodiments. This can be particularly troublesome for web applications, as context may be lost when there is a need to obtain a new id token. For example, consider the scenario when a user is typing an email in a web-based email application. In the middle of typing the email, the web-based email application will revert back to the identity provider to obtain a new id token because the current id token has expired. This can cause a loss in context for the email application, which results in difficulty for the user.

To solve this problem, current systems allow the resource provider to drop a cookie with an entity that may be valid for much longer time periods (as compared to the id token validity) based on an id token that is issued for a shorter time period. For example, a resource provider may drop a cookie that is valid for several days for an id token that is only valid for 1 hour. This creates a security gap in that an entity may have access to resources at a resource provider long after the id token has expired, and potentially when the entity should be denied access to the resource provider altogether due to noncompliance of certain policies by the entity.

For example, in some embodiments, the user account may have been deleted. However, the resource provider will not be aware of this account deletion resulting in an entity having a rogue account accessing the resource provider by virtue of the cookie provided to the entity.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a networked computing environment. The method includes acts for managing user sessions in the networked computing environment. The method includes at an identity provider computer system, providing a first id token to a resource provider for an entity. The first id token has therein a first policy check interval having a value defining a period when the first id token should be revalidated. Due to expiration of the first policy check interval, a first refresh token is received from the resource provider computer system that received the first id token. As a result of receiving the first refresh token from the resource provider computer system, the identity provider computer system evaluates conditional access policy for the entity. If the identity provider computer system determines that the conditional access policy for the entity has been met, the identity provider computer system provides a new id token and a new refresh token to the resource provider computer system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

As discussed above, there are several problems that exist when implementing web-based applications. In particular, short id token refresh times can result in a user constantly losing focus in a web-based application as the user needs to be re-authenticated with an identity provider to continue using the web-based application. Solutions to this problem have resulted in security gaps whereby unauthorized users or users that do not comply with current policy are able to access the web-based application in contradiction with present policy considerations. Thus, a technical problem exists whereby web applications are either more difficult to use due to loss of context for the user requiring additional user interaction, or alternatively security problems exist due to solutions which attempt to resolve the loss of context issues. Embodiments illustrated herein implement a technical means of implementing server to server communication to allow an identity provider computer and a resource provider computer to communicate such that user sessions can be invalidated for reasons other than token expiration or cookie expiration. That is, a resource provider computer system can contact an identity provider computer system to identify current policy information for a particular entity. The particular policy information (e.g., a new id token or a rejection as described below) for the entity can be provided back to the resource provider computer system which can then enforce the policy as appropriate thus providing a technical solution to the problems described above. That is, embodiments implement a practical application of server to server communication whereby interface functionality and responsiveness is realized by the user while still protecting system security and policy enforcement.

Embodiments illustrated herein allow communication between a resource provider implementing a web application and an identity provider to allow the resource provider to ask for status information regarding the entities attempting to access the resource provider in a fashion that allows the entities to maintain context at the resource provider to eliminate the security gaps described previously.

Figure 1:
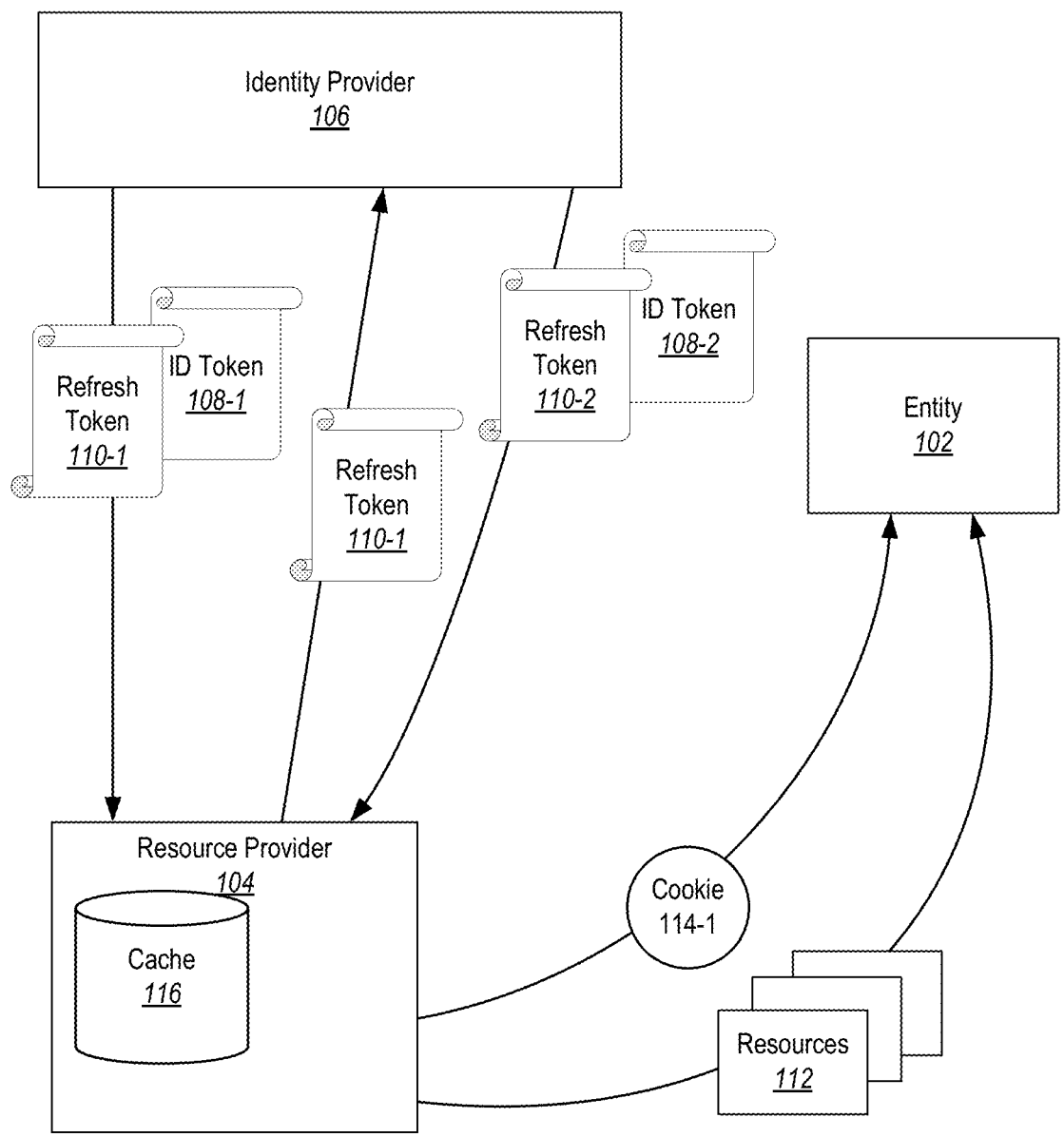
FIG. 1 illustrates a server to server communication system for authenticating entities.

Referring now to FIG. 1, an example is illustrated. FIG. 1 illustrates an entity 102. In the illustrated example, the entity 102 may include a user as well as the device and associated clients (including applications) used by the user. The entity 102 may have need to access resources from a resource provider 104, which in the illustrated example, is a web based resource provider, such as a web application. To obtain access to the resources, such as web application resources, the entity will first authenticate with an identity provider 106. In some embodiments, the identity provider 106 is a Security Token Service. In a web-based application scenario, a client web application initiates communication and redirects the user to the identity provider 106 and, as a result, the web-based application receives an id token 108-1 that allows the entity 102 to access the resource provider 104. The entity 102 can authenticate to the identity provider 106 through any one of a number of different well-known authentication and id token issuance schemes, other less well-known authentication schemes, or even future authentication schemes yet to be developed. Suffice it to say, in the particular example shown in FIG. 1, the resource provider 104 receives from the identity provider 106 an id token 108-1 and a refresh token 110-1. While the example in FIG. 1 illustrates that a refresh token 110-1 is issued, in other embodiments, an authorization code may be provided to the resource provider 104. The authorization code can be exchanged for the refresh token 110-1. In some embodiments, the id token, the authorization code, or both are provided to the resource provider by providing them to a web server and web API, which along with a backing data store storing the resources 112, implement the resource provider 104.

The id token 108-1 typically includes a timestamp indicating when the id token was issued. The id token 108-1 may alternatively or additionally include information indicating when the id token 108-1 expires. In some embodiments, the id token 108-1 may include information about authentication procedures used by the entity 102 to authenticate to the identity provider 106. For example, the id token 108-1 may indicate that the id token 108-1 was obtained by the entity 102 authenticating to the identity provider using a simple user identity and secret authentication protocol. One such common protocol is the password authentication protocol, where the identity is a username and the secret is a password. Alternatively or additionally, if the entity 102 is authenticated to the identity provider 106 using double factor authentication, this can be indicated in the id token 108-1. Alternatively or additionally, if the entity 102 is authenticated to the identity provider using a certain strength of password, this sort of information can be indicated in the id token 108-1 itself. For example, the id token may indicate the minimum length of password used to authenticate to the identity provider, use of special characters in the password used to authenticate to the identity provider, use of both upper and lowercase letters in the password used to authenticate to the identity provider, absence of common passwords or other words in the password used to authenticate to the identity provider, etc.

Figure 2A:
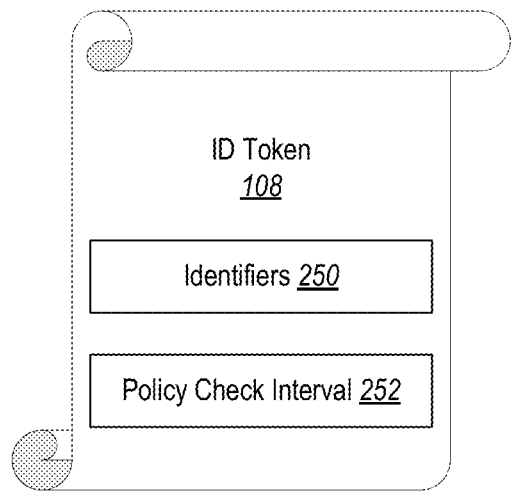
FIGS. 2A and 2B illustrate id tokens and claims that may be included in the id tokens.
Figure 2B:
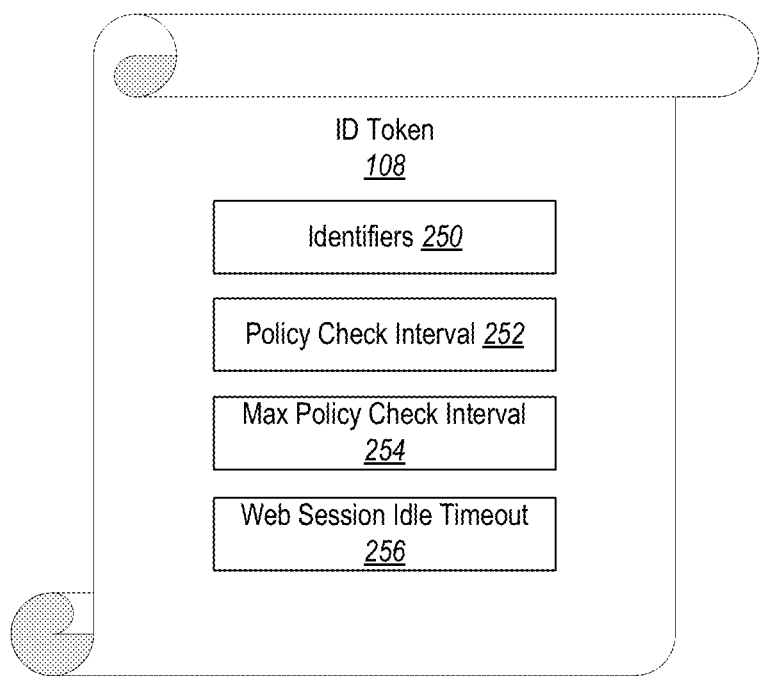

FIGS. 2A and 2B illustrate various versions of information that may be included in an id token, illustrated generically at 108. In FIG. 2A, the id token 108 may include identifiers 250. The identifiers 250 may include for example, an identifier for a particular log on session. Alternatively or additionally, the identifiers 250 may include an identifier identifying the entity. Alternatively or additionally, the identifiers 250 may include an identifier identifying groups (e.g., roles) to which the entity belongs, and which can be used to grant additional privileges to the entity. Alternatively or additionally, the identifiers 250 may include an identifier identifying restricting group identifiers identifying groups to which the entity belongs, and which can be used to restrict privileges of the entity. Alternatively or additionally, the identifiers 250 may include an identifier identifying special capabilities that the entity has. Alternatively or additionally, the identifiers 250 may include an identifier identifying the owner of the id token 108. Other identifiers may alternatively or additionally be included in the identifiers 250.

FIG. 2A further illustrates that the id token 108 includes a policy check interval 252. The policy check interval 252 includes a value used by a resource provider 104, as discussed in more detail below, to cause the identity provider 106 to evaluate conditional access polices including entity health, entity access conditions (e.g., location or network), computing environment conditions, entity behavior, or other items. In some embodiments, this interval may be the same value as an id token renewal time. For example, for the examples illustrated above, this may be 1 hour. In some embodiments, this value is not configurable by a tenant administrator.

FIG. 2B illustrates that other additional information may be included in the id token 108. In some embodiments, the id token 108 includes a max policy check interval 254. This value 254 will be used by the resource provider 104 to determine how long a user session can be kept alive when a policy evaluation endpoint (illustrated by the identity provider 102) is not accessible. This may occur, for example, if the identity provider 104 is not accessible due to computer system failure, network issues, or other reasons. In one example embodiment, the max policy check interval 254 may be 3 days. In some embodiments, the max policy check interval 254 is not configurable by the tenant administrator.

FIG. 2B illustrates that in some embodiments, the id token 108 includes a web session idle timeout 256 that was configured by an administrator as part of enforced conditional access policy. This value will be used by a resource provider 104 to control browser idle timeouts. That is, if a user client is idle for a particular time as specified in the web session idle timeout 256, then the user may be logged out of the user session. In one example embodiment, the web session idle timeout is 30 minutes.

In some embodiments, the id token 108-1 will be for a particular user as well as for a client used by the particular user. Thus, in this example, the entity 102 includes both the user and the client (including potentially a particular application) used by the user. For example, the user may use a laptop computer with a corresponding laptop computer client application to perform the authentication and resource requests. Thus, the id token 108-1 may include information about the laptop computer client of the entity 102. Alternatively, the user may use a smart phone to perform the authentication, in which case a corresponding smart phone client application is used to perform the authentication and to perform resource requests, meaning that the id token 108-1 will be for an entity 102 including a user using a smart phone client.

Returning once again to the example illustrated in FIG. 1, the identity provider 106 can provide the id token 108-1 to the resource provider 104. The resource provider 104 can evaluate the id token to determine that the entity 102 has been properly authenticated to the identity provider 106 and that the id token 108-1 is otherwise valid. In particular, the id token 108-1 may have an expiration and the resource provider 104 can determine that the id token 108-1 has not expired. Ordinarily, so long as this evaluation of the id token 108-1 passes the various checks, then the resources 112 will be provided to the entity 102, when requested by the entity 102.

In the example illustrated in FIG. 1, the resource provider 104 caches the id token 108-1 and the refresh token 110-1 in the cache 116. The resource provider 104 issues a long lived session cookie 114-1, which in the illustrated example has an infinite lifetime, that points to the cache 116. While the session cookie lifetime is technically infinite, in reality it will be that of refresh token 110-1 lifetime.

On every request from the entity 102, the resource provider 104 evaluates the policy check interval 252. If the policy check interval 252 has expired, the refresh token 110-1 causes the resource provider 104 to make a server to server call to the identity provider 106 on behalf of the entity 102. It sends the refresh token 110-1 and, optionally, the client IP address to the identity provider 106. The identity provider 106 evaluates conditional access policies before when reissuing id token. The refresh token 110-1 only needs to cause renewal of the id token 108-1 when the entity 102 is requesting access to resource provider 104 resources 112.

As illustrated in FIG. 1, the resource provider sends the refresh token 110-1 to the identity provider 106 as specified in the policy check interval 252. That is, the policy check interval 252 in the id token 108 identifies how often the resource provider 104 should provide the refresh token 110-1 to the identity provider 106 to allow the identity provider 106 to perform various policy checks. FIG. 1 illustrates that assuming that all policy checks are satisfied, then the identity provider 106 will provide a new refresh token 110-2 and a new id token 108-2. This will allow the user session to continue allowing the resource provider 104 to provide resources 112 to the entity 102 without interruption. This process can be repeated as needed to keep the user session active.

However, it should be appreciated that conditions may result in the refresh token 110-2 in the id token 108-2 not being able to be returned to the resource provider 104. In particular, FIGS. 3A, 3B, and 3C illustrate examples of various alternatives that may occur under various conditions.

Figure 3A:
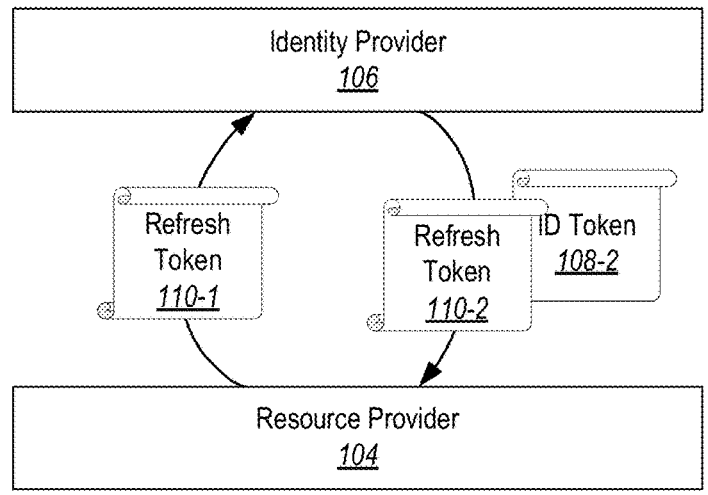
FIGS. 3A-3C illustrate various alternative scenarios when attempting to renew an id token.
Figure 3B:
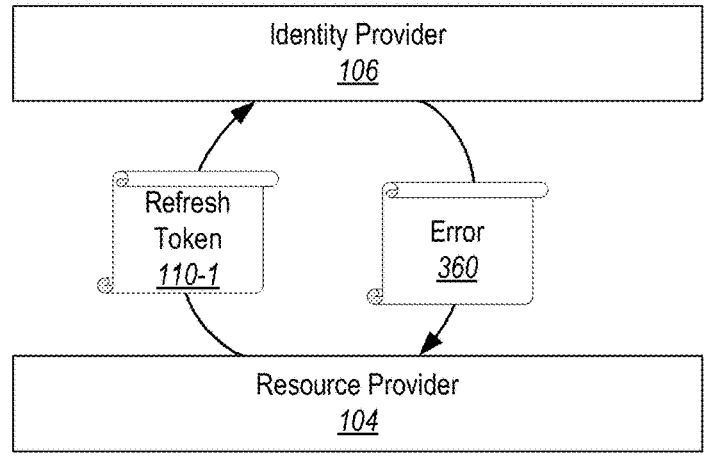
Figure 3C:
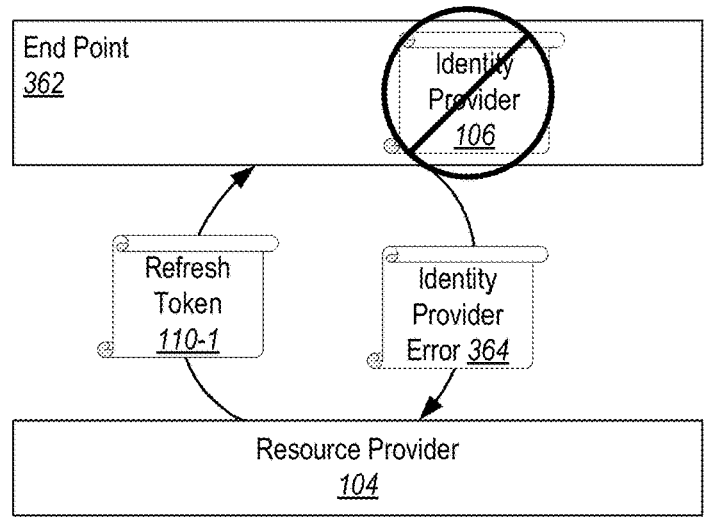

FIG. 3A illustrates the condition illustrated above whereby all policy checks are satisfied and where the identity provider 106 provides the refresh token 110-2 and the id token 108-2 to the resource provider 104 in response to the refresh token 110-1 being sent to the identity provider 106. This assumes the ordinary and successful case where a user session can be continued based on various policies having been met. Such policies may include, for example, policies related to user state, client application state, policy state, location of the entity, networks being used by the entity, behavior patterns of the entity, or other conditional access conditions.

Note that in some embodiments, the identity provider 106 may wish to change the interval at which the resource provider 104 communicates with the identity provider 106 for policy regarding the entity 102. This can be accomplished by simply changing the policy check interval 252 included in an id token 108 returned to the resource provider 104. For example, the id token 108-2 may be updated with a policy check interval as determined by the identity provider 106. This may occur for various reasons. For example, the identity provider 106 may determine that network conditions exist that warrant a shorter policy check interval. For example, a network may be under attack. During the attack period, the policy check interval can be lowered in the id tokens sent to entities to allow the identity provider to perform more frequent policy checks for entities. As network conditions improve, the policy check intervals included in id tokens may be lengthened. A longer policy check interval can be used to reduce network traffic and overhead computing processes needed for authentication and user session maintenance.

However, it can occur that the identity provider 106 identifies that policies have not been met and therefore causes the resource provider 104 to invalidate the user session. An example of this is illustrated in FIG. 3B. In this example, the resource provider 104 provides the refresh token 110-1 to the identity provider 106. The identity provider 106 evaluates policy with respect to the entity 102 and identifies that certain policy has not been met. The identity provider 106 can then send an error 360 to the resource provider 104. For example, the identity provider 106 may identify that the entity 102 has deleted their user account. Alternatively or additionally, the identity provider 106 can identify that the entity 102 has had other change to the entity that would cause the entity 102 to not comply with certain policy.

As discussed previously, in some embodiments, the resource provider 104 will provide the IP address of the entity 102 to the identity provider 106. The identity provider 106 may identify that the entity 102 is attempting access from a network or location that is not compliant with policy at the identity provider 106. In some embodiments, the identity provider 106 may identify that an insufficient authentication method was used by the entity 102 based on the IP address of the entity 102. Thus, the identity provider 106 can send the error 360 causing the user session between the resource provider 104 and the entity 102 to be terminated.

In some embodiments, the error 360 may include information that can be provided to the entity 102 to indicate to the entity 102 why the user session is being terminated. For example, in some embodiments the resource provider can use the information in the error 360 to indicate to the entity 102 that the user session is being ended due to use of a token that was obtained from the identity provider 106 using an authentication method that is not sufficient for the location or network being used by the entity 102. For example, the entity 102 may be on an un-trusted network. Policy may require that the entity use multifactor authentication when accessing the resource provider 104 from an un-trusted network. If the id token 108-1 was obtained from the identity provider 106 using single factor authentication, then as illustrated in the example in FIG. 3B, when the refresh token 110-1 and the id token 108-1 are sent to the identity provider 106, the identity provider 106 can emit an error 360 to the resource provider 104 indicating that insufficient authentication methods were used given the location or network being used by the entity 102. In some embodiments, this requires that the entity 102 have specialized functionality. In particular, ordinarily an entity 102 will simply use a cached id token 108-1 at the entity 102 when attempting to establish a user session between the entity 102 and the resource provider 104. If the refresh token id token 108-1 has not expired, the entity 102 will assume that the id token 108-1 at the entity 102 is valid and will continue to attempt to establish a user session between the entity 102 and the resource provider 104. However, if the entity 102 has extended functionality beyond what typical client systems possess, the entity will be able to understand information identifying why a user session has been invalidated. In this case, the entity 102 can evaluate the information indicating why a user session was invalidated and does not need to continue retrying attempting to establish a user session using an id token that cannot be used to establish the user session. Rather the entity 102 can simply return to the identity provider 106 to obtain a new refresh token in a fashion that complies with policy. For example. in the example described above, the entity 102 will use multifactor authentication to obtain the id token when the entity 102 is at a particular location or using a particular network for which policy requires multifactor authentication.

Thus, FIG. 3B illustrates that if the identity provider 106 responds with an error 360 indicating that a refresh token 110-1 is invalid, then the resource provider 104 will redirect the entity 102 to the identity provider 106 for reauthentication.

FIG. 3C illustrates another example of where errors may be provided. In this example, the resource provider 104 sends the refresh token 110-1 to an endpoint 362 where the resource provider 104 believes that the identity provider 106 resides. However, due to hardware failure, system failure, network unavailability, or for other reasons, the identity provider 106 may be unavailable at the endpoint 362. In this case an identity provider error 364 is returned to the resource provider 104. This indicates that no identity provider is available to evaluate the policy for the entity 102. However, as this is a fairly common occurrence, provisions may be made to allow the user session to continue for a limited period of time. For example, as discussed above a max policy check interval 254 may be included in the id token 108-1. So long as this max policy check interval 254 has not been exceeded, the user session can continue between the resource provider 104 and the entity 102 as the resource provider 104 periodically resends the refresh token 110-1 and the id token 108-1 to the endpoint 362 to attempt to have policy evaluated for the entity 102. If the max policy check interval 254 expires and the resource provider 104 has still not been able to obtain a new refresh token and new id token, then the resource provider 104 will terminate this user session and redirect the entity 102 to the resource provider 106 to obtain new credentials. Thus, as illustrated in FIG. 3C, if the resource provider receives a network or another error which indicates an identity provider outage, the resource provider 104 can treat the Max policy check interval 254 as the policy check interval and continue the session.

For completeness, the following illustrates an example of pseudocode describing aspects of the process is illustrated above for implementing various embodiments of the invention.

```
//On Sign In:
Validate AccessToken
Use Code and get RefreshToken, (this also returns another
AccessToken).
Create cache entry and cache Session Info
    Cache xms_pci, xms_mpci, inactivity interval from AccessToken.
    Add last_policy_check_time=AccessToken_issuanceTime in the cache
entry.
    Cache RefreshToken.
If KMSI==true
    Issue persisted cookie and include reference to the cache entry.
    //Cookie lifetime=current_time + 90 days (same as Evo's SSO cookie)
Else
    Issue session cookie and include reference to the cache entry.
//On Every request:
Validate cookie.
Load cache entry associated with the cookie.
// policy check logic
If current_time > last_policy_check_time+xms_pci
    Load RefreshToken and Call token endpoint to check policy.
    If (policy check fails)
        Force re-signin
    EndIf
    If (policy check unavailable) && (current_time>
last_policy_check_time+xms_mpci)
        Force resignin
    ElseIf (policy check unavailable) && (current_time <=
last_policy_check_time+xms_mpci)
        // Optional if high value operations exist
        Set internal claim/call context:
restrict_high_value_operations=true
    EndIf
    //policy check returned success.
    Validate AccessToken and RefreshToken
    Update Cache Entry
        Update new RefreshToken in the same cache entry
        Update new xms_pci, xms_mpci, ... from AccessToken in the cache
entry
        Update last_policy_check_time=AccessToken_issuanceTime in the
cache entry.
    If KMSI==true
        Re-Issue persisted cookie. Cookie_lifetime=current_time + 90days
(matching the Evo behavior).
    Else
        Issue session cookie
    EndIf
EndIf
...
// Optional at authorization time
If restrict_high_value_operations==true
    // This is the case where there is an outage and the policy check
is a bit stale.
    Block high value operation
EndIf
```

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
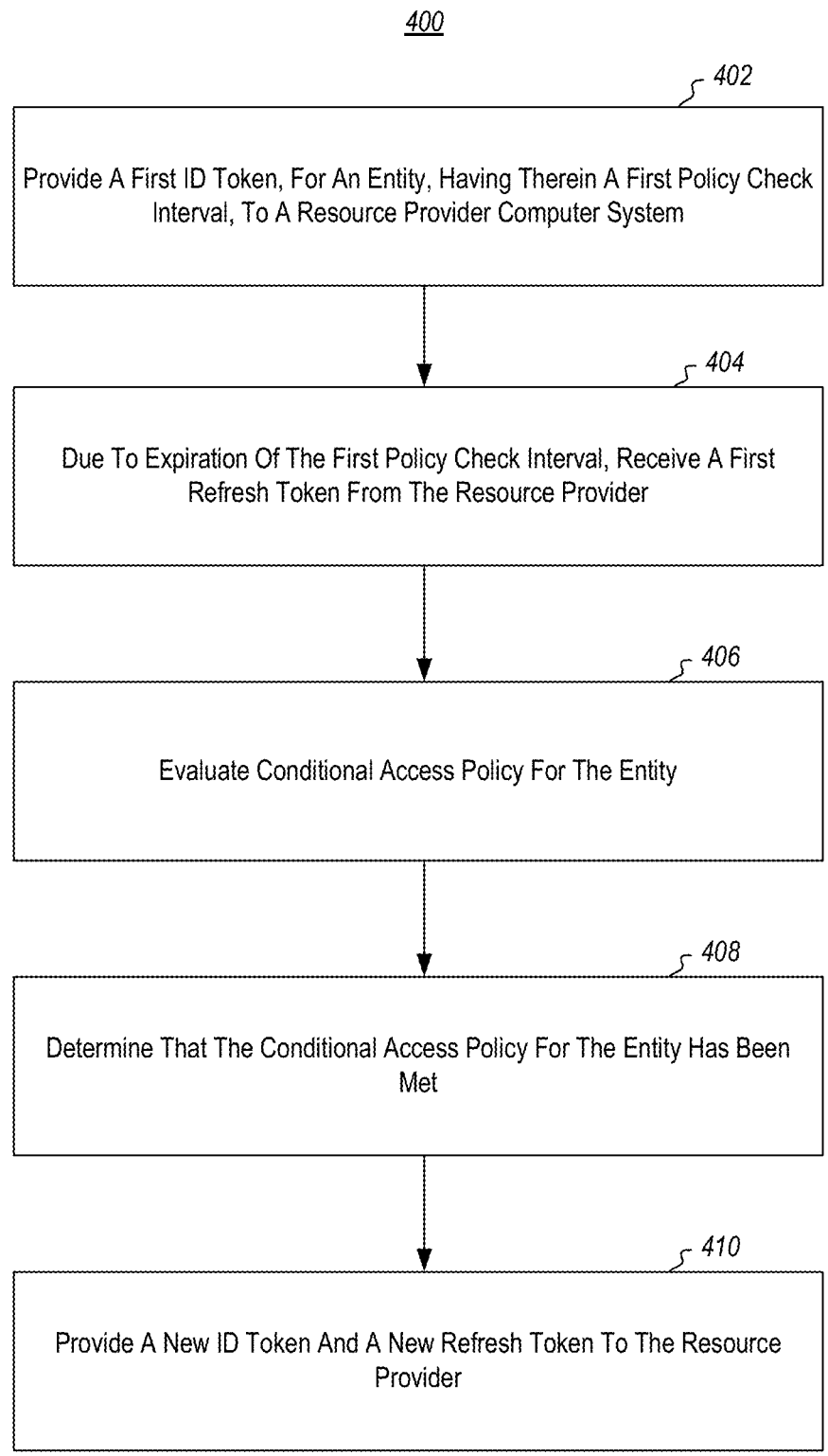
FIG. 4 illustrates a method of managing user sessions.

Referring now to FIG. 4, a method 400 is illustrated. The method 400 includes acts for managing user sessions in a networked computing environment. The method includes at an identity provider computer system, providing a first id token to a resource provider (act 402). The first id token has therein a first policy check interval having a value defining a period when the first id token should be revalidated.

The method 400 further includes, at the identity provider computer system, due to expiration of the first policy check interval, receiving a first refresh token from the resource provider computer system (act 404).

The method 400 further includes, at the identity provider computer system, as a result of receiving the first refresh token from the resource provider computer system, evaluating conditional access policy for the entity (act 406).

The method 400 further includes, at the identity provider computer system, determining that the conditional access policy for the entity has been met (act 408).

The method 400 further includes, providing a new id token and a new refresh token to the resource provider computer system (act 410).

The method 400 may further include the identity provider computer system providing an authorization code to the entity that is exchanged at the resource provider computer system for the first refresh token.

The method 400 may be practiced where the new id token comprises a new policy check interval having a value that is different than the value of the first policy check interval in the first refresh token.

The method 400 may be practiced where evaluating conditional access policy for the entity comprises evaluating at least one of user state changes, client state changes, policy state changes, conditional access conditions being met, location of the entity, or behavior patterns by the entity.

The method 400 may be practiced where the first id token comprises a max policy check interval having a value defining a maximum time that can elapse when the identity provider computer system is unavailable to the resource provider computer system before a user session must be invalidated.

The method 400 may be practiced where the first id token comprises a web session idle timeout having a value defining when a web application at the resource provider computer system should timeout due to lack of interaction from a user. In some such embodiments, the method 400 may further include receiving input from an administrator at the identity provider computer system defining the value of the web session idle timeout.

Figure 5:
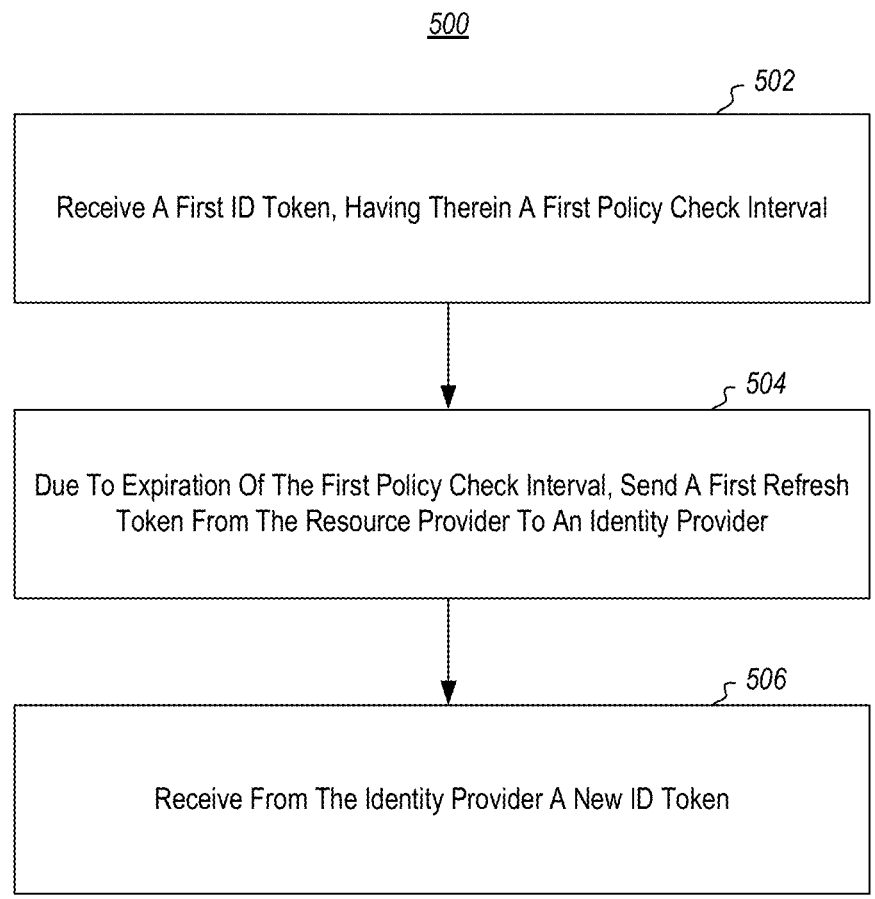
FIG. 5 illustrates another method of managing user session.

Referring now to FIG. 5, a method 500 is illustrated. The method 500 includes acts for managing user sessions in a networked computing environment. The method 500 includes, at a resource provider computer system, receiving a first id token, having therein a first policy check interval (act 502). The first policy check interval has a value defining a period when the first id token should be revalidated. The first id token is used to provide resources from the resource provider computer system to an entity. In particular, the first id token indicates that the resource provider can provide resources to the entity.

The method 500 further includes, at the resource provider computer system, due to expiration of the first policy check interval, sending a first refresh token from the resource provider computer system to an identity provider computer system (act 504).

The method 500 further includes receiving from the identity provider computer system a new id token (act 506). This is performed as a result of the identity provider computer system evaluating conditional access policy for the entity and determining that the conditional access policy for the entity has been met.

The method 500 may further includes the receiving an authorization code provided to the entity by the identity provider computer system and exchanging the authorization code for the first refresh token.

The method 500 may further include receiving the first refresh token from the identity provider computer system.

The method 500 may be practiced where the first id token is received from the identity provider computer system.

The method 500 may be practiced where the new id token comprises a new policy check interval having a value that is different than the value of the first policy check interval in the first refresh token.

The method 500 may be practiced where the first id token comprises a max policy check interval having a value defining a maximum time that can elapse when the identity provider computer system is unavailable to the resource provider computer system before a user session must be invalidated.

The method 500 may be practiced where the first id token comprises a web session idle timeout having a value defining when a web application at the resource provider computer system should timeout due to lack of interaction from a user.

The method 500 may further include providing a long lived cookie, which points to a cache at the resource provider computer system, to the entity.

Figure 6:
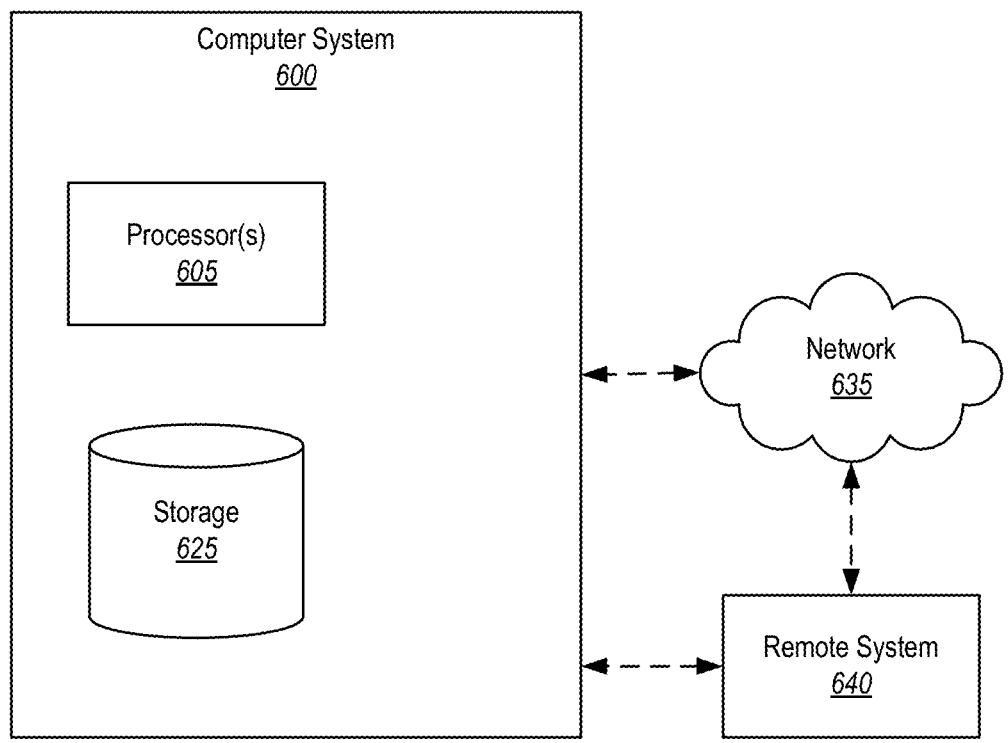
FIG. 6 illustrates a computing system where embodiments may be practiced.

Having just described the various features and functionalities of some of the disclosed embodiments, attention is now directed to FIG. 6, which illustrates an example computer system 600 that may be used to facilitate the operations described herein. Computer systems, such as system 600 may be used to implement any of the computer systems described above.

The methods may be practiced by a computer system 600 including one or more processors 605 and computer-readable storage 625 such as computer memory. In particular, the computer memory may store computer-executable instructions that when executed by one or more processors 605 cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media, such as the storage 625, for carrying or storing computer-executable instructions, data structures, or combinations thereof. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" (e.g., network 635) is defined as one or more data links that enable the transport of electronic data between computer systems, modules, other electronic devices, or combinations thereof. When information is transferred or provided over a network or another communications connection (either hardwired, wireless, or a combination of hardwired or wireless) to a computer (e.g., remote system 640), the computer properly views the connection as a transmission medium. Transmissions media can include a network, or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM, to less volatile computer-readable physical storage media at a computer system, or combinations thereof. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features, methodological acts, or combinations thereof, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of managing user sessions in a networked computing environment, the method comprising:
    at an identity provider computer system, providing a first id token for an entity to a resource provider computer system, wherein the first id token includes an expiration indicator reflecting when the first id token expires, and the first id token further includes a first policy check interval defining how often the resource provider computer system is to communicate with the identity provider computer system to inquire about conditional access policy that is to be implemented against the entity;
    at the identity provider computer system, due to expiration of the first policy check interval, receiving a first refresh token from the resource provider computer system;
    at the identity provider computer system, as a result of receiving the first refresh token from the resource provider computer system, evaluating the conditional access policy for the entity;
    at the identity provider computer system, determining that the conditional access policy for the entity has been met; and
    as a result, providing a new id token and a new refresh token to the resource provider computer system.

2. The method of claim 1, further comprising the identity provider computer system providing an authorization code to the entity that is exchanged at the resource provider computer system for the first refresh token.

3. The method of claim 1, wherein the new id token comprises a new policy check interval that is different than the first policy check interval.

4. The method of claim 1, wherein evaluating the conditional access policy for the entity comprises evaluating at least one of user state changes, client state changes, policy state changes, conditional access conditions being met, location of the entity, or behavior patterns by the entity.

5. The method of claim 1, wherein the first id token comprises a max policy check interval having a value defining a maximum time that can elapse when the identity provider computer system is unavailable to the resource provider computer system before a user session must be invalidated.

6. The method of claim 1, wherein the first id token comprises a web session idle timeout having a value defining when a web application at the resource provider computer system should timeout due to lack of interaction from a user.

7. The method of claim 6, further comprising receiving input from an administrator at the identity provider computer system defining the value of the web session idle timeout.

8. A method of managing user sessions in a networked computing environment, the method comprising:
    at a resource provider computer system, receiving a first id token, the first id token being used to provide resources from the resource provider computer system to an entity, wherein the first id token include an expiration indicator reflecting when the first id token expires, and the first id token further includes a first policy check interval defining how often the resource provider computer system is to communicate with an identity provider computer system to inquire about conditional access policy that is to be implemented against the entity;
    at the resource provider computer system, due to expiration of the first policy check interval, sending a first refresh token from the resource provider computer system to the identity provider computer system; and
    receiving from the identity provider computer system a new id token, as a result of the identity provider computer system evaluating the conditional access policy for the entity and determining that the conditional access policy for the entity has been met.

9. The method of claim 8, further comprising receiving an authorization code provided to the entity by the identity provider computer system and exchanging the authorization code for the first refresh token.

10. The method of claim 8, further comprising receiving the first refresh token from the identity provider computer system.

11. The method of claim 8, wherein the first id token is received from the identity provider computer system.

12. The method of claim 8, wherein the new id token comprises a new policy check interval that is different than the first policy check interval.

13. The method of claim 8, wherein the first id token comprises a max policy check interval having a value defining a maximum time that can elapse when the identity provider computer system is unavailable to the resource provider computer system before a user session must be invalidated.

14. The method of claim 8, wherein the first id token comprises a web session idle timeout having a value defining when a web application at the resource provider computer system should timeout due to lack of interaction from a user.

15. The method of claim 8, further comprising providing a long lived cookie, which points to a cache at the resource provider computer system, to the entity.

16. A computing system comprising:
   an identity provider computer system comprising at least one processor and one or more hardware storage devices that store instructions that when executed by the at least one processor to cause the identity provider computer system to:
      provide a first id token to a resource provider computer system, wherein the first id token includes an expiration indicator reflecting when the first id token expires, and the first id token further includes a first policy check interval defining how often the resource provider computer system is to communicate with the identity provider computer system to inquire about conditional access policy that is to be implemented against the entity; and
   the resource provider computer system, which comprises least one processor an one or more hardware storage devices that store instructions that when executed by the at least one processor of the resource provider computer system to cause the resource provider computer system to:
      due to expiration of the first policy check interval, send a first refresh token from the resource provider computer system to the identity provider computer system; and
      receive, from the identity provider computer system, a new id token, wherein the identity provider computer system is further configured to evaluate the conditional access policy for the entity and provide the new id token and a new refresh token to the resource provider as a result of determining that the conditional access poky for the entity has been met.

17. The computing system of claim 16, wherein the new id token comprises a new policy check interval that is different than the first policy check interval.

18. The computing system of claim 16, wherein the first id token comprises a max policy check interval having a value defining a maximum time that can elapse when the identity provider computer system is unavailable to the resource provider computer system before a user session must be invalidated.

19. The computing system of claim 16, wherein the first id token comprises a web session idle timeout having a value defining when a web application at the resource provider computer system should timeout due to lack of interaction from a user.

20. The computing system of claim 16, wherein the resource provider is further configured to provide a long lived cookie, which points to a cache at the resource provider computer system, to the entity.

\* \* \* \* \*

UNITED STATES PATENT AND TRADEMARK OFFICE
CERTIFICATE OF CORRECTION

PATENT NO. : 11,252,146 B2
APPLICATION NO. : 16/688707
DATED : February 15, 2022
INVENTOR(S) : Violet Anna Barhudarian et al.

It is certified that error appears in the above-identified patent and that said Letters Patent is hereby corrected as shown below:

On the Title Page

<u>In Item (73), Assignee</u>
Line 1, change "MICROSOFT TECHNOLOGLY LICENSING, LLC" to --MICROSOFT TECHNOLOGY LICENSING, LLC--

Signed and Sealed this
Nineteenth Day of April, 2022

*Katherine Kelly Vidal*

Katherine Kelly Vidal
*Director of the United States Patent and Trademark Office*